(12) United States Patent
Bates et al.

(10) Patent No.: US 7,773,093 B2
(45) Date of Patent: *Aug. 10, 2010

(54) METHOD AND APPARATUS FOR ASSOCIATING THE COLOR OF AN OBJECT WITH AN EVENT

(75) Inventors: Daniel Bates, Manhattan Beach, CA (US); Jorge Geaga, Los Angeles, CA (US)

(73) Assignee: Creatier Interactive, LLC, Los Angeles, CA (US)

( * ) Notice: Subject to any disclaimer, the term of this patent is extended or adjusted under 35 U.S.C. 154(b) by 915 days.

This patent is subject to a terminal disclaimer.

(21) Appl. No.: 10/219,175

(22) Filed: Aug. 15, 2002

(65) Prior Publication Data

US 2005/0162439 A1  Jul. 28, 2005

Related U.S. Application Data

(63) Continuation of application No. 09/679,391, filed on Oct. 3, 2000.

(51) Int. Cl.
*G09G 5/02* (2006.01)
*G06K 9/00* (2006.01)

(52) U.S. Cl. ...................... 345/589; 382/103
(58) Field of Classification Search ................ 345/589; 382/103

See application file for complete search history.

(56) References Cited

U.S. PATENT DOCUMENTS

| | | | |
|---|---|---|---|
| 3,878,557 A | 4/1975 | Vidovic | |
| 4,719,584 A | 1/1988 | Rue et al. | |
| 4,758,714 A | 7/1988 | Carlson et al. | |
| 4,797,920 A | 1/1989 | Stein | |

(Continued)

FOREIGN PATENT DOCUMENTS

JP  10-091814  4/1998

(Continued)

OTHER PUBLICATIONS

International Journal of Pattern Recognition and Artificial Intelligence, vol. 8, No. 6, pp. 1343-1379, World Scientific Publishing Company, 1994, "Feature Extraction and Matching as Signal Detection".

(Continued)

*Primary Examiner*—Ulka Chauhan
*Assistant Examiner*—Jeffrey J Chow
(74) *Attorney, Agent, or Firm*—Katten Muchin Rosenman LLP

(57) ABSTRACT

The present invention provides a method and apparatus for associating the color of an object with an event. In one or more embodiments, the invention takes a streaming or static media and associates an active, dynamic, or static object with an event by its given color. The event may be, for instance the retrieval of a document at a specified URL in a web browser or the retrieval of other information in non-web browser implementations. In one embodiment, the invention defines the color by its mathematical properties. For instance, one embodiment uses the RGB standard which separates the red, green, and blue properties of the color as numerical values. Another embodiment also uses the HSV characteristics of the color, which define hue, saturation, and value as components of color. Another embodiment uses both RGB and HSV characteristics.

37 Claims, 8 Drawing Sheets

U.S. PATENT DOCUMENTS

| | | | |
|---|---|---|---|
| 4,924,303 A | 5/1990 | Brandon et al. | |
| 4,969,189 A | 11/1990 | Ohta et al. | |
| 5,053,607 A | 10/1991 | Carlson et al. | |
| 5,125,022 A | 6/1992 | Hunt et al. | |
| 5,204,749 A | 4/1993 | Toyama et al. | |
| 5,297,194 A | 3/1994 | Hunt et al. | |
| 5,343,529 A | 8/1994 | Goldfine et al. | |
| 5,430,809 A | 7/1995 | Tomitaka | |
| 5,463,728 A | 10/1995 | Blahut et al. | |
| H1506 H * | 12/1995 | Beretta | 345/591 |
| 5,475,756 A | 12/1995 | Merritt | |
| 5,517,605 A | 5/1996 | Wolf | |
| 5,590,261 A | 12/1996 | Sclaroff et al. | |
| 5,659,742 A | 8/1997 | Beattie et al. | |
| 5,677,955 A | 10/1997 | Doggett et al. | |
| 5,684,715 A | 11/1997 | Palmer | |
| 5,708,845 A | 1/1998 | Wistendahl et al. | |
| 5,724,901 A | 3/1998 | Guy et al. | |
| 5,729,741 A | 3/1998 | Liaguno et al. | |
| 5,737,553 A | 4/1998 | Bartok | |
| 5,745,103 A | 4/1998 | Smith | |
| 5,751,286 A | 5/1998 | Barber et al. | |
| 5,752,160 A | 5/1998 | Dunn | |
| 5,767,894 A | 6/1998 | Fuller et al. | |
| 5,774,191 A * | 6/1998 | Iverson | 348/592 |
| 5,774,666 A | 6/1998 | Portuesi | |
| 5,775,995 A | 7/1998 | Okamoto | |
| 5,778,187 A | 7/1998 | Monteiro et al. | |
| 5,781,228 A | 7/1998 | Sposato | |
| 5,793,414 A | 8/1998 | Shaffer | |
| 5,794,249 A | 8/1998 | Orsolini et al. | |
| 5,809,165 A * | 9/1998 | Massen | 382/168 |
| 5,818,440 A | 10/1998 | Allibhoy et al. | |
| 5,819,286 A | 10/1998 | Yang et al. | |
| 5,822,530 A | 10/1998 | Brown | |
| 5,841,978 A | 11/1998 | Rhoads | |
| 5,867,208 A | 2/1999 | McLaren | |
| 5,867,584 A | 2/1999 | Hu et al. | |
| 5,872,857 A | 2/1999 | Chodos et al. | |
| 5,874,985 A | 2/1999 | Matthews, III | |
| 5,875,303 A | 2/1999 | Huizer et al. | |
| 5,885,086 A | 3/1999 | Gerber et al. | |
| 5,886,705 A * | 3/1999 | Lentz | 345/582 |
| 5,893,110 A | 4/1999 | Weber et al. | |
| 5,900,905 A | 5/1999 | Shoff et al. | |
| 5,903,816 A | 5/1999 | Broadwin et al. | |
| 5,903,830 A | 5/1999 | Joao et al. | |
| 5,907,323 A | 5/1999 | Lawler et al. | |
| 5,907,597 A | 5/1999 | Mark | |
| 5,912,980 A | 6/1999 | Hunke | |
| 5,929,849 A | 7/1999 | Kikinis | |
| 5,929,850 A | 7/1999 | Broadwin et al. | |
| 5,931,908 A | 8/1999 | Gerba et al. | |
| 5,937,404 A | 8/1999 | Csaszar et al. | |
| 5,949,907 A * | 9/1999 | Raz | 382/205 |
| 5,973,692 A * | 10/1999 | Knowlton et al. | 715/835 |
| 5,983,005 A | 11/1999 | Monteiro et al. | |
| 5,983,244 A | 11/1999 | Nation | |
| 5,987,454 A | 11/1999 | Hobbs | |
| 5,987,509 A | 11/1999 | Portuesi | |
| 6,005,602 A | 12/1999 | Matthews | |
| 6,006,241 A | 12/1999 | Purnaveja | |
| 6,006,256 A | 12/1999 | Zdepski et al. | |
| 6,008,816 A | 12/1999 | Eisler et al. | |
| 6,008,820 A | 12/1999 | Chauvin et al. | |
| 6,016,349 A | 1/2000 | Musa | |
| 6,016,504 A | 1/2000 | Arnold et al. | |
| 6,018,748 A | 1/2000 | Smith | |
| 6,026,411 A * | 2/2000 | Delp | 707/104.1 |
| 6,031,541 A | 2/2000 | Lipscomb et al. | |
| 6,032,181 A | 2/2000 | Bedgedjian et al. | |
| 6,067,401 A | 5/2000 | Abecassis | |
| 6,069,630 A | 5/2000 | Lisle et al. | |
| 6,070,161 A | 5/2000 | Higashio | |
| 6,070,176 A | 5/2000 | Downs et al. | |
| 6,076,104 A | 6/2000 | McCue | |
| 6,154,879 A | 11/2000 | Pare, Jr. et al. | |
| 6,161,108 A | 12/2000 | Ukigawa et al. | |
| 6,164,528 A | 12/2000 | Hills et al. | |
| 6,169,573 B1 * | 1/2001 | Sampath-Kumar et al. | 348/169 |
| 6,184,878 B1 | 2/2001 | Alonso et al. | |
| 6,188,777 B1 | 2/2001 | Darrell et al. | |
| 6,198,833 B1 | 3/2001 | Rangan et al. | |
| 6,202,151 B1 | 3/2001 | Musgrave et al. | |
| 6,204,843 B1 | 3/2001 | Freeman et al. | |
| 6,205,231 B1 | 3/2001 | Isadore-Barreca et al. | |
| 6,208,025 B1 | 3/2001 | Bellaar et al. | |
| 6,222,541 B1 * | 4/2001 | Bates et al. | 715/786 |
| 6,222,937 B1 | 4/2001 | Cohen et al. | |
| 6,229,535 B1 * | 5/2001 | Tokuda | 715/760 |
| 6,240,555 B1 | 5/2001 | Shoff et al. | |
| 6,252,586 B1 | 6/2001 | Freeman et al. | |
| 6,253,238 B1 | 6/2001 | Lauder et al. | |
| 6,256,785 B1 | 7/2001 | Klappert et al. | |
| 6,269,348 B1 | 7/2001 | Pare, Jr. et al. | |
| 6,275,989 B1 | 8/2001 | Broadwin et al. | |
| 6,310,625 B1 * | 10/2001 | Yoshio et al. | 345/473 |
| 6,337,696 B1 | 1/2002 | Lindhorst et al. | |
| 6,337,916 B1 | 1/2002 | Boyd et al. | |
| 6,357,042 B2 | 3/2002 | Srinivasan et al. | |
| 6,397,181 B1 | 5/2002 | Li et al. | |
| 6,411,725 B1 | 6/2002 | Rhoads | |
| 6,424,370 B1 | 7/2002 | Courtney | |
| 6,424,738 B1 * | 7/2002 | Katsumura et al. | 382/165 |
| 6,457,018 B1 | 9/2002 | Rubin | |
| 6,493,707 B1 | 12/2002 | Dey et al. | |
| 6,496,981 B1 | 12/2002 | Wistendahl et al. | |
| 6,536,043 B1 | 3/2003 | Guedalia | |
| 6,549,643 B1 | 4/2003 | Toklu et al. | |
| 6,603,921 B1 | 8/2003 | Kanevsky et al. | |
| 6,625,315 B2 | 9/2003 | Laumeyer et al. | |
| 6,637,032 B1 | 10/2003 | Feinleib | |
| 6,642,940 B1 | 11/2003 | Dakss et al. | |
| 6,697,796 B2 | 2/2004 | Kermani | |
| 6,724,915 B1 * | 4/2004 | Toklu et al. | 382/103 |
| 6,741,655 B1 | 5/2004 | Chang et al. | |
| 6,744,908 B2 | 6/2004 | Chujoh et al. | |
| 6,819,797 B1 | 11/2004 | Smith et al. | |
| 6,859,799 B1 | 2/2005 | Yuen | |
| 6,925,474 B2 | 8/2005 | McGrath et al. | |
| 6,937,744 B1 * | 8/2005 | Toyama | 382/103 |
| 6,990,448 B2 | 1/2006 | Charlesworth et al. | |
| 7,003,156 B1 | 2/2006 | Yamamoto et al. | |
| 7,020,192 B1 | 3/2006 | Yamaguchi et al. | |
| 7,024,020 B2 | 4/2006 | Lee et al. | |
| 7,032,182 B2 | 4/2006 | Prabhu | |
| 7,054,812 B2 | 5/2006 | Charlesworth et al. | |
| 7,158,676 B1 * | 1/2007 | Rainsford | 382/190 |
| 2002/0035579 A1 * | 3/2002 | Wang et al. | 707/513 |
| 2002/0056136 A1 * | 5/2002 | Wistendahl et al. | 725/135 |
| 2002/0069218 A1 | 6/2002 | Sull et al. | |
| 2002/0087530 A1 | 7/2002 | Smith et al. | |
| 2003/0122860 A1 | 7/2003 | Ino | |
| 2003/0226150 A1 | 12/2003 | Berberet et al. | |
| 2004/0215660 A1 | 10/2004 | Ikeda | |
| 2004/0227768 A1 | 11/2004 | Bates et al. | |
| 2004/0233233 A1 | 11/2004 | Salkind et al. | |
| 2005/0022107 A1 | 1/2005 | Dey et al. | |
| 2005/0044056 A1 | 2/2005 | Ray et al. | |
| 2005/0044105 A1 | 2/2005 | Terrell | |
| 2005/0086703 A1 | 4/2005 | Gupta et al. | |
| 2005/0128318 A1 | 6/2005 | Leow et al. | |
| 2005/0162439 A1 | 7/2005 | Bates et al. | |
| 2005/0182759 A1 | 8/2005 | Yuen | |

| | | |
|---|---|---|
| 2005/0223031 A1 | 10/2005 | Zisserman et al. |
| 2005/0223034 A1 | 10/2005 | Kaneko et al. |
| 2005/0271304 A1 | 12/2005 | Retterath et al. |
| 2006/0082662 A1 | 4/2006 | Isaacson |
| 2006/0271594 A1 | 11/2006 | Haberman |

FOREIGN PATENT DOCUMENTS

| | | |
|---|---|---|
| JP | 10-091814 A | 4/1998 |
| WO | WO 97/30551 | 8/1997 |

OTHER PUBLICATIONS

S.M. Smith; Asset-2: Real-Time Motion Segmentation and Object Tracking Technical Report TR95SMS2b; Oxford Center for Functional Magnetic resonance Imaging of the Brain, Feb. 19, 2004, 34 pages, http://www.fmrib.ox.ac.uk/~steve/asset/asset2/asset2.html.

Dakss J. et al., "Hyperlinked Video," Proceedings of the SPIE, vol. 3528, Nov. 1999 pp. 2-10.

European Search Report from EP 01 97 5637, dated Oct. 6, 2006.

European Search Report EP 02789565.

European Search Report from EP 01 97 5637, dated Aug. 23, 2006.

International Search report for PCT/US01/30711, published as WO 02/29544 A1 on Apr. 11, 2002.

\* cited by examiner

METHOD AND APPARATUS FOR ASSOCIATING THE COLOR OF AN OBJECT WITH AN EVENT

This is a continuation, of prior application Ser. No. 09/679,391, filed Oct. 3, 2000, which is hereby incorporated herein by reference in its entirety.

BACKGROUND OF THE INVENTION

1. Field of the Invention

The present invention relates generally to event processing, and in particular to associating the color of an object with an event.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

When using a computer or other interactive device a user can interact with the device in various ways. One way is to use a mouse. The user utilizes the mouse to position a pointer somewhere on a screen. The user then depresses a mouse button and depending on where the pointer is, something pre-programmed will happen if that area of the screen is "hot".

In the context of the Internet, the user can position the mouse pointer over a hot spot "hyperlinked" to a web page and depress the mouse button. This will cause the computer, set-top box, or other device to send a signal to a server to retrieve that web page and display it on the computer screen.

We foresee the desirability to interact in this manner in many different contexts, not only linking with web pages. Current schemes are limited in the contexts that a user may interact. Before further describing the limitations of current schemes, a discussion of event processing is instructive.

Event Processing

"Event processing" refers to the association between some type of "action" and the occurrence of an "event". Such a term is used herein in the context of a user's computing experience. The user performs an action followed by an event, followed by a series of other actions followed by other events.

An action occurs when a user positions a cursor in a specified location on a computer screen, for instance using a mouse, and depresses one of the mouse buttons. This example shows a common type of action, but many other actions exist as well within the context of computer event processing, including the input of text, a voice command, or any other type of action.

The example action may take place in any computing environment, but one common environment that the action occurs is in a web browser. A web browser is a graphical user interface that enables users to utilize the Internet, for instance by viewing web pages. Normally the user will position the mouse pointer over a "hyperlink" and depress the mouse button there. This, in turn, triggers an event. The event in this example is to cause a server to retrieve another web page. Thus, in this example, the user interacts with the Internet by a series of actions followed by events.

Current event processing is disadvantageous, in part, because the types of actions available and the events initiated by the actions are limited. Before further discussing the drawbacks of current event processing, an overview of the Internet is provided below.

Internet

The information network known as the "Internet" has become increasingly popular. The Internet provides a body of information which may be accessed by users via computers for such purposes as business, education, and entertainment. In particular, the Internet includes a large collection of interconnected documents, images, sounds, videos, and other forms of media which are stored in computers in a system known as the World Wide Web or simply "the web".

Internet resources are typically accessed in a two-way environment via a network connection. For example, connectivity to the network may be via a conventional twisted-pair telephone line which has a relatively low data-carrying capacity (e.g., bandwidth), or via a higher bandwidth path, which may comprise optical fiber, coaxial cable, ISDN, xDSL, wireless connections, or other transmission mechanisms. To retrieve data from a network destination (e.g., an Internet site), a user sends a message to the network destination to request the transfer of information to the user's computer, referred to as a client. The network destination typically includes a computer known as a server. The server then sends a request signal to a source function, which may be a memory which is coupled to the server. The source function includes the user-requested information which may comprise, for example, text, graphics, audio and/or video data. In response to the request signal from the server, the source function provides the requested information to the client.

HTML

Source information which is stored in the source function is often stored in a format known as "Hypertext Markup Language (HTML)". This file or script format allows the display of text, graphics and audio information, and provides links to other pages of information through "hyperlinks." Hyperlinks are strings of characters in a particular format that specify the address of the desired page of information.

HTML is a system for marking documents to indicate how the document should be displayed, and how various documents should be linked together. HTML is a form of Standard Generalized Markup Language (SGML), defined by the International Standards Organization. HTML specifies the grammar and syntax of markup tags which are inserted into a data file to define how the data will be presented when read by a computer program known as a "web browser". Conventional web browsers include Internet Explorer, Netscape Navigator, and others.

The data file, which is typically stored on a server, includes one or more web pages which are visited by users who have computers which may run different browsers. When a page is visited, HTML data output from the server is downloaded to the client computer. The client computer's browser processes the data to format a layout for the page so the page may be viewed by the user on a computer screen. Generally, HTML tags provide text formatting, hypertext links to other pages, and links to sound and image elements. HTML tags also define input fields for interactive web pages.

An HTML application is made available to users on the web by storing the HTML file in a directory that is accessible to a server. Such a server is typically a web server which conforms to a web browser-supported protocol known as Hypertext Transfer Protocol (HTTP). Servers that conform to other protocols such as the File Transfer Protocol (FTP) or GOPHER may also be used, but do not support interactive HTML files.

HTTP defines a set of rules that servers and browsers follow when communicating with each other. Typically, the process begins when a user accesses an icon in an HTML page which is the anchor of a hyperlink, (for instance, by positioning a cursor on the icon and depressing a mouse button), or the user inputs a Uniform Resource Locator (URL) to his or her web browser, described below. A connection is then made to the server at the address and port number specified by the URL. Next, the browser sends a request to retrieve an object from the server, or to post data to an object on the server. The server sends a response to the browser including a status code and the response data. The connection between the browser and server is then closed.

URL

A URL is a unique address which identifies virtually all files and resources on the Internet. A URL has the form:

method://server:port/path/file#anchor.

The "method" of accessing the resource is the web browser-supported protocol, and may include, for example, HTTP, FTP, GOPHER, TELNET, NEWS, or MAILTO. The "server: port" indicates the name of the server which is providing the resource, and is alternatively known as the Internet domain name. For example, many businesses will use their business name as part of the server field. The port designation is the port number on the server, but is usually not used since a default port is assumed. The "path" indicates the directory path to the resource. The file indicates the file name of the resource. The "anchor" indicates the named element in the HTML document. Not all fields are required.

Consider the following URL, for example:

http://www.business.com/information/
profits.html#section_1.

The access method is HTTP, the server is www.business.com, there is no port specified, the path is news, the file is profits. html, and the anchor is section_1.

Thus, it may be seen that web browsers operate in a two-way communication environment to access information by sending a request signal defined by a URL command to a server, and receiving information in return.

Current Event Processing Schemes

In the context of the Internet, event processing has been limited by the nature of the web. Originally, the web was largely a textual body of interconnected information. Actions were limited to depressing a mouse button on a text link which initiated the event of retrieving another web page from a specified URL. These methods are disadvantageous because they are static. Such events have no application in an active environment, for instance where streaming video or television signals are involved, and such events have no application outside of a web browser (i.e., where a GUI is translating HTML commands into actions).

As the web evolved, other types of event processing have emerged. In particular, the web evolved to have a more active nature. First, the text-based web became merged with images. The images resided in various formats and could also be used to associate an action with an event. The images, however, suffered the same drawback as the text and essentially performed the same function. For instance, the images were used in the same event context (e.g., depressing a mouse button on the image) and the same actions resulted (e.g., the image caused a server to send another web page to the user).

After images came more active web environments. One example came in the form of animation where a sequential series of images are displayed in the web browser which cause the image to appear to move on the screen. To allow the user to act upon an animated image, one scheme takes each frame of the animated image and pre-determines where on that individual frame a potential action should be associated with an event.

For instance, imagine an animation of a runner holding a baton where the runner is moving horizontally across the screen and the desired action is to depress a mouse button when the pointer is over the baton. In this example, assume the animation consists of 100 images. Using one scheme, the 100 images are each individually stored in a computer and each image is analyzed to find where the baton was on the screen.

Along with each of the 100 images is an image map specifying that in frame 1 the boundary of the baton is in a first position and in frame 2, the boundary of the baton is in a second position. To map to these positions, the prior art essentially draws a wire frame around the baton in each frame. Therefore, 100 wire frames must be drawn in varying locations. The baton in a moving image varies in position and angle. This in turn varies the shape of the wire frame in each frame of the image.

The prior scheme is extremely disadvantageous because it requires a tremendous amount of manual pre-processing to draw 100 varied size wire frames. Such preprocessing contains a large lag on overhead. This scheme also must store each and every potential action in a computer and then wait for the action to occur. This technique uses a large amount of the computer's storage space and a large amount of time to create the wire frames. This scheme, in addition, is bound to a web browser implementation and may only trigger events relating to the accessing of a web page at a specified URL.

As the web has developed more recently, such schemes have become even less advantageous. Specifically, the web has expanded away from a static model and now incorporates other technologies, such as television and other signals. The web through this expansion has also moved to other media forms, such as "set-top boxes" and interactive television sets where the user interacts with the web using a conventional television set as an output device. With these other media forms and other environments, other types of GUIs (not only web browsers) and other types of actions (not only the retrieval of a web page from a specific URL) are desired. However, there is currently no efficient way to process events in such environments.

SUMMARY OF THE INVENTION

The present invention provides a method and apparatus for associating the color of an object with an event. In one or more embodiments, the invention takes a streaming or static digital image frames and associates an active, dynamic, or static object with an event by its color.

In one embodiment, an event is the retrieval of a document at a specified URL and the display of the document in a web browser. In another embodiment, an event includes the retrieval of textual or audio information associated with the object. In another embodiment, the event comprises switching to a separate video stream in an environment using streaming media, such as a digital video disc (DVD) player or recorder, or other suitable video environment.

The invention defines the color in a location (termed a region of interest) by its digital color mathematical properties. For instance, one embodiment uses the RGB standard which separates the red, green, and blue properties of the color as numerical values. Another embodiment also uses the HSV characteristics of the color, which define hue, saturation, and value as components of color. Another embodiment uses both RGB and HSV characteristics. In one embodiment, the color characteristics are obtained from a digital RGB frame buffer.

As described above, the event links to another URL (i.e., to facilitate a transaction over the Internet) or in the case of a DVD or other video environment, the event causes the video stream to transition to a different data track (i.e., to pull up different information) or to a different video stream.

In one embodiment the invention uses an edge detection scheme to help define the boundaries for the colors in a digital RGB frame. The algorithm developed gives those pixels an "edge" which is not visible to the user, nor drawn on the screen, nor pre-processed prior to the user viewing the images formed by the pixels. The values of the pixels defines an edge rather than the actual drawing of a wire frame on the screen.

Thus, one or more embodiments of the present invention create the associations between objects and events dynamically in that the data which creates the association is a property of the image itself (i.e., its color values). The present invention requires no alteration or pre-processing of the image to create the associations.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for associating the color of an object with an event. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

One or more embodiments of the present invention are directed to enhancing a user's ability to interact with a computer, set-top box, interactive television set, or other processing device. According to embodiments of the present invention, the user provides input on some area of a display device, for instance by depressing a mouse button at a specified location. The invention then determines where the user has depressed the mouse button and what color value appears on the display device at the time the user has depressed the mouse button. Then, the invention initiates an event that corresponds to that color value.

Event Processing

In one or more embodiments, the invention takes a streaming or static media and associates an active, dynamic, or static object with an event by its given color. The event may be, for instance, the retrieval of a document at a specified URL in a web browser or the retrieval of other information in non-web browser implementations. Other implementations include, for instance, the viewing of media, via a television, DVD or other media player, set-top devices, web-TV, interactive TV, and video-games.

Take, for example, a web page implementing streaming video. In the example, a game show host is wearing a green shirt. If a user provides input to the screen by depressing a mouse with the cursor in a location where the green shirt is located, the invention links to a URL associated with the green shirt. Thus, the moving color may substitute for a conventional, static, text link. In another embodiment, the game show host with the green shirt may be in a television show. In this embodiment, providing input on the moving green shirt may initiate a different event, such as providing information about the shirt or the game show host.

Figure 1:
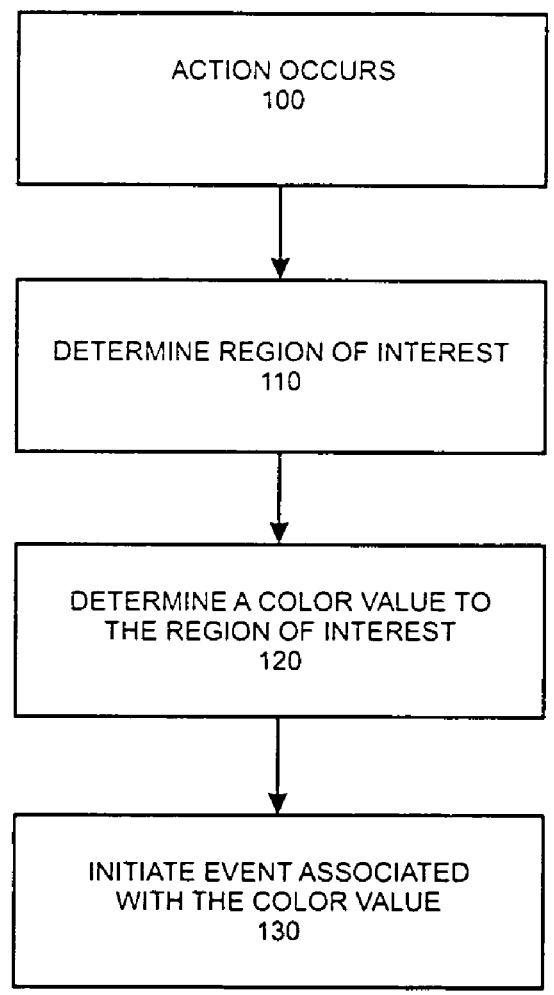
FIG. 1 is a flowchart showing how to associate the color of an object with an event according to an embodiment of the present invention.

One embodiment of the present invention is shown in FIG. 1. At step 100, an action occurs. At step 110, the location of the action (a region of interest) is determined. Locating a region of interest is well known in the art.

One method to locate a region of interest is to obtain an ordered pair corresponding to the location of the cursor at the moment of the action. For instance, a computer screen may be represented as a two-dimensional graph wherein the axis of the graph resides in the lower left hand corner of the computer screen. Thus all ordered pairs will correspond to positive values of x,y pairs on the graph.

After defining the region of interest, the value associated with a color in the region of interest is determined at step 120. Thereafter, at step 130, an event associated with that color is initiated.

Color Characteristics

In one embodiment, the invention defines the color by its mathematical properties. For instance, one embodiment uses the RGB standard which separates the red, green, and blue properties of the color as numerical values. Another embodiment also uses the HSV characteristics of the color, which define hue, saturation, and value as components of color. HSV characteristics further define the properties of a color, for instance V represents an analog of the intensity of a color or how bright the color appears. Another embodiment of the present invention uses both RGB and HSV characteristics.

Figure 2:
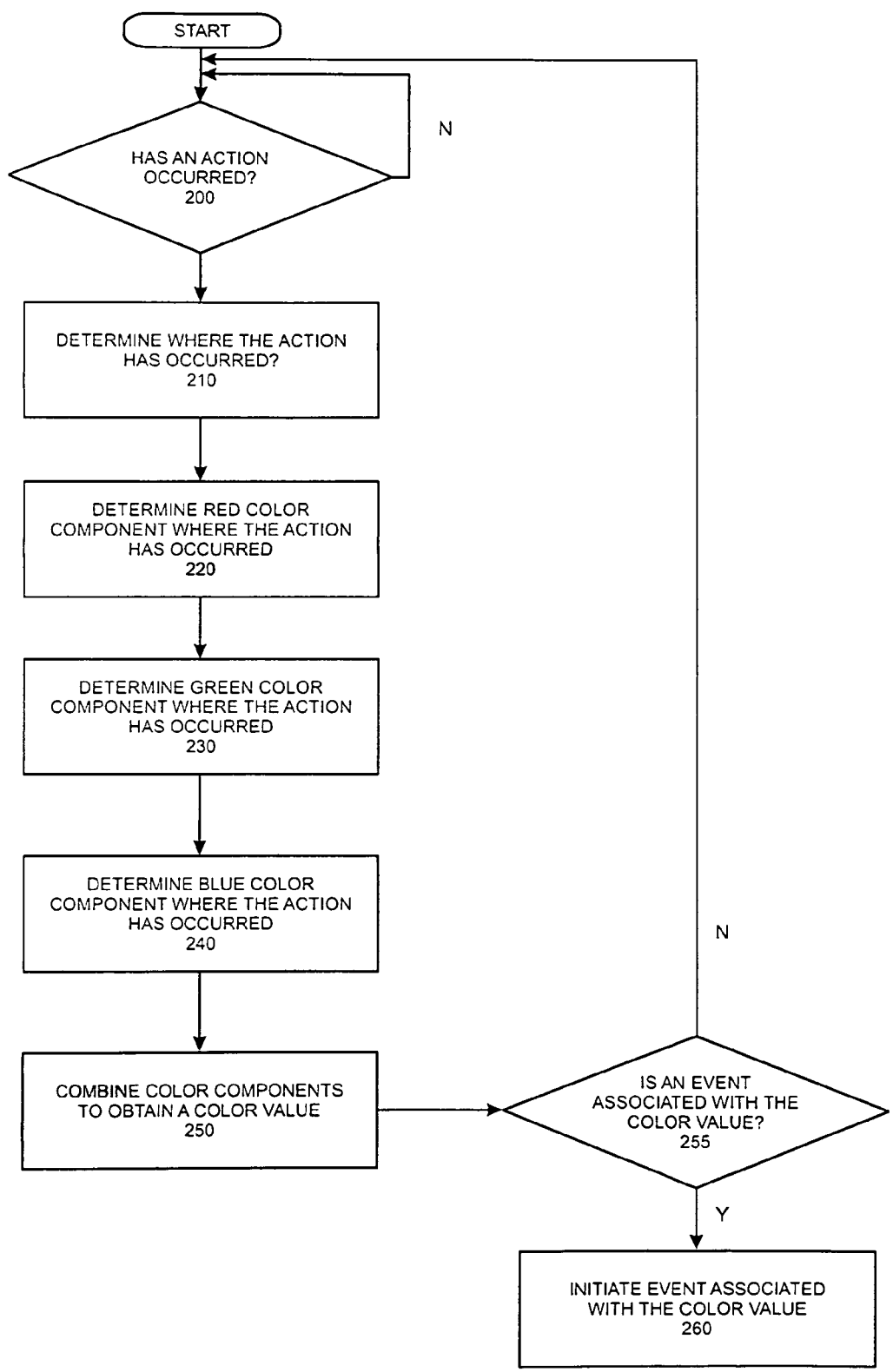
FIG. 2 is a flowchart showing how to define the color characteristics of an object according to an embodiment of the present invention.

One embodiment defines color characteristics as shown in FIG. 2. At step 200, it is determined whether an action has occurred. If no action occurred, step 200 repeats until an action occurs. If the action has occurred, it is determined where the action has occurred at step 210.

The location is shown herein with respect to a single pixel, "pixel A". At step 220, a red component of a color for pixel A is determined. Then, at step 230, a green component of the color for pixel A is determined. Next, at step 240, a blue component of the color for pixel A is determined. Thereafter, at step 250, the color characteristics are combined to form a color value for pixel A.

After step 250, it is determined whether any event is associated with the color value at step 255. If no event is associated with that color value, no event is initiated and the process repeats at step 200. If an event is associated with the color value, then at step 260 an event associated with the color value is initiated.

Figure 3:
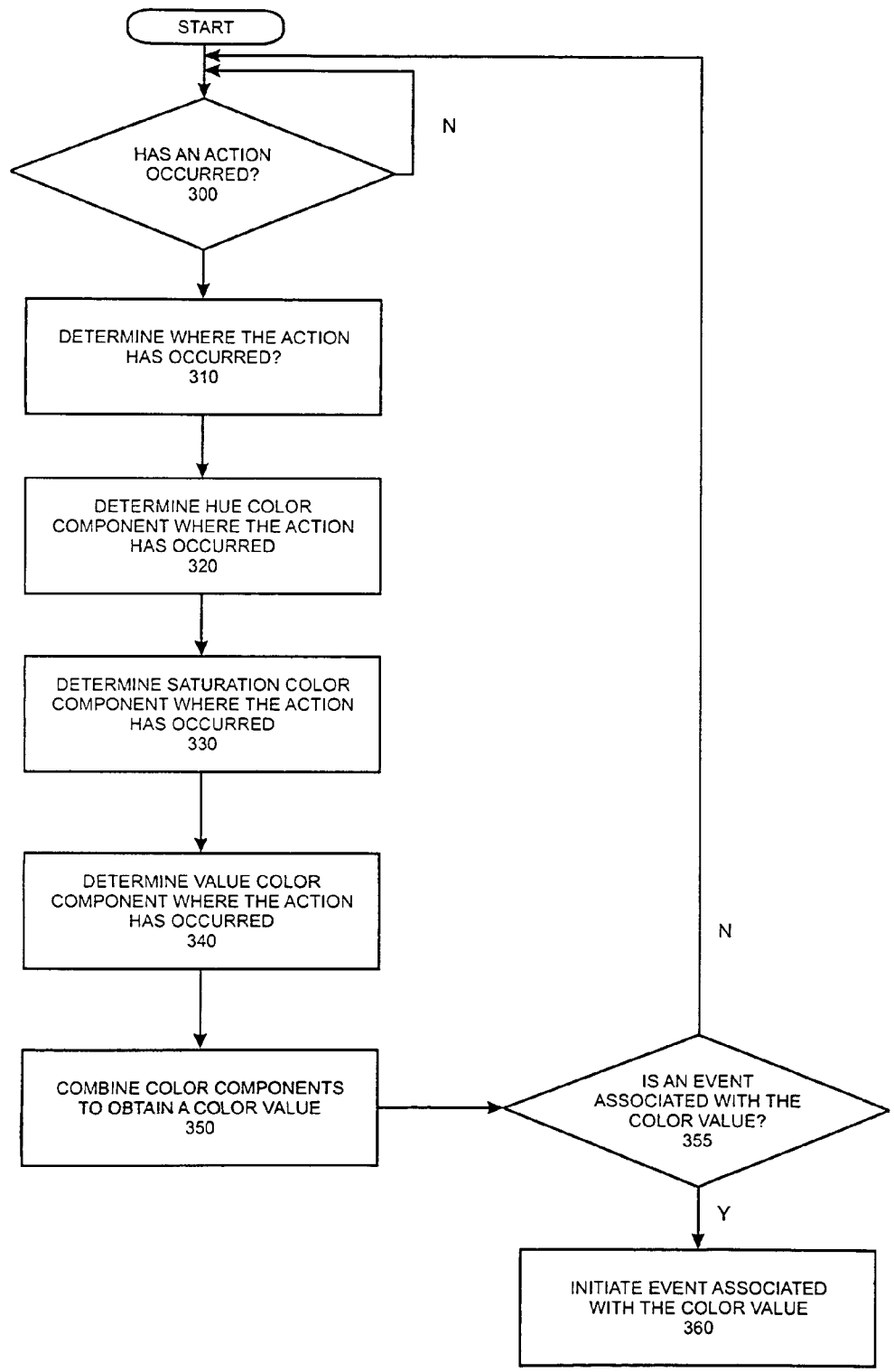
FIG. 3 is a flowchart showing how to define the color characteristics of an object according to another embodiment of the present invention.

One embodiment defines color characteristics as shown in FIG. 3. At step 300, it is determined whether an action has occurred. If no action occurred, step 300 repeats until an action occurs. If the action has occurred, it is determined where the action has occurred at step 310. The location is shown herein with respect to a single pixel, "pixel B". At step 320, a hue component of a color for pixel B is determined. Then, at step 330, a saturation component of the color for pixel B is determined. Next, at step 340, a value component of the color for pixel B is determined.

Thereafter, at step 350, the color characteristics are combined to form a color value for pixel B. After step 350, it is determined whether any event is associated with the color value at step 355. If no event is associated with that color value, no event is initiated and the process repeats at step 300. If an event is associated with the color value, then at step 360 an event associated with the color value is initiated.

Figure 4:
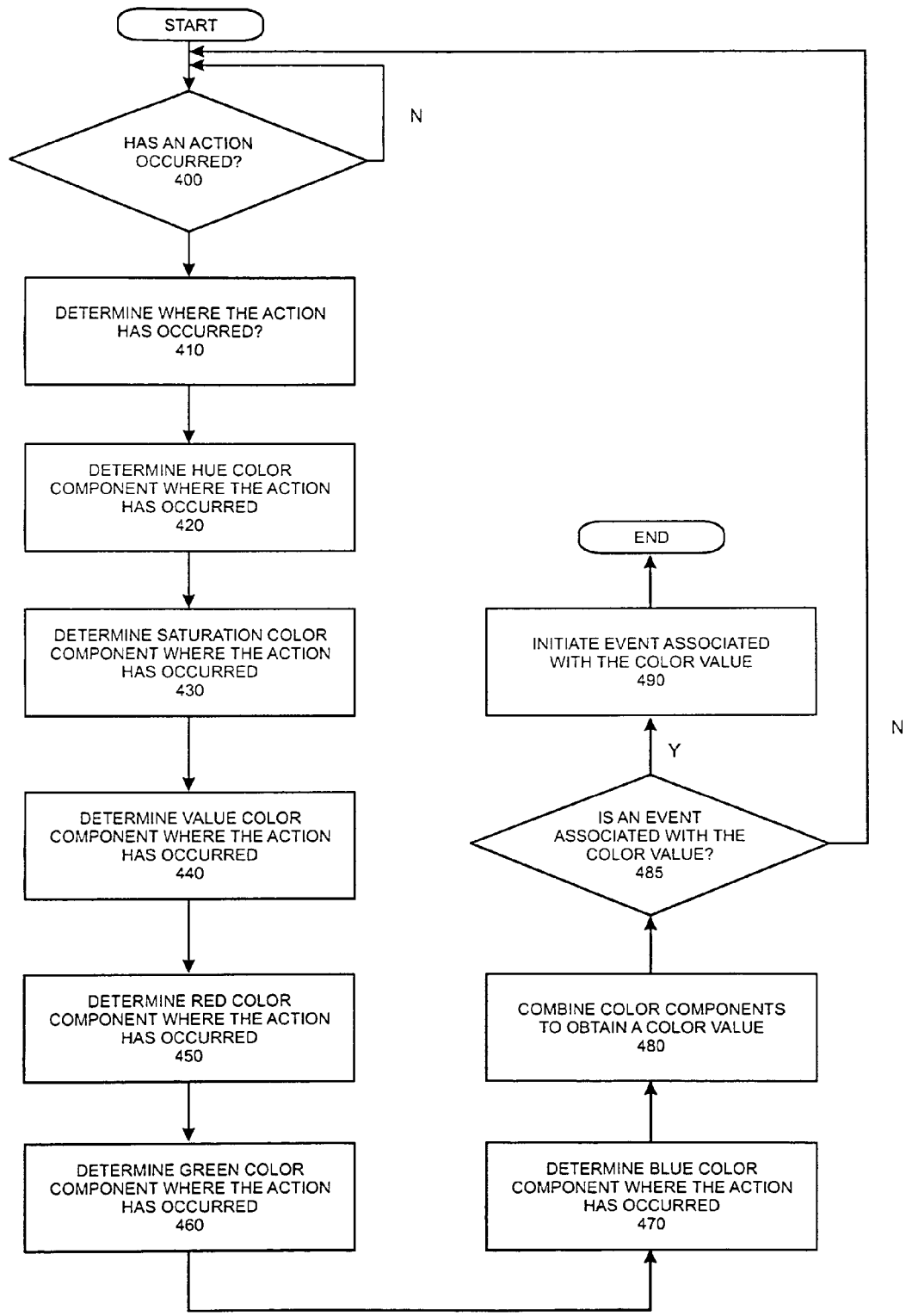
FIG. 4 is a flowchart showing how to define the color characteristics of an object according to another embodiment of the present invention.

One embodiment defines color characteristics as shown in FIG. 4. At step 400, it is determined whether an action has occurred. If no action occurred, step 400 repeats until an action occurs. If the action has occurred, it is determined where the action has occurred at step 410. The location is shown herein with respect to a single pixel, "pixel C". At step 420, a hue component of a color for pixel C is determined. Then, at step 430, a saturation component of the color for pixel C is determined. Next, at step 440, a value component of the color for pixel C is determined. At step 450, a red component of a color for pixel C is determined. Then, at step 460, a green component of the color for pixel C is determined. Next, at step 470, a blue component of the color for pixel C is determined.

Thereafter, at step 480, the color characteristics are combined to form a color value for pixel B. After step 480, it is determined whether any event is associated with the color value at step 485. If no event is associated with that color value, no event is initiated and the process repeats at step 400. If an event is associated with the color value, then at step 490 an event associated with the color value is initiated.

Frame Buffer

In a computer or other comparable device, images are often used as a form of output. A common way that such devices handle images or streams of images (e.g., video) is by using a "frame buffer". For offline pre-processing or for real-time processing using high speed computers, the RGB frame buffers reside in memory. Alternatively, a special high speed video board can be used to process an RGB frame buffer for real-time processing.

A video signal, for instance, comprises a series of still images shown sequentially where the series of images appears so quickly that a user perceives the series of pictures to be a continuous stream of motion. As the computer processes each image, data relating to the image is stored in the frame buffer. Such data includes, for instance, the color values associated with each pixel at each location on the screen.

As a new image is displayed, new data about the image is stored in the frame buffer. Depending on the size of the frame buffer, many sequential images may be stored there before it fills up and old image data must be overwritten.

Figure 7:
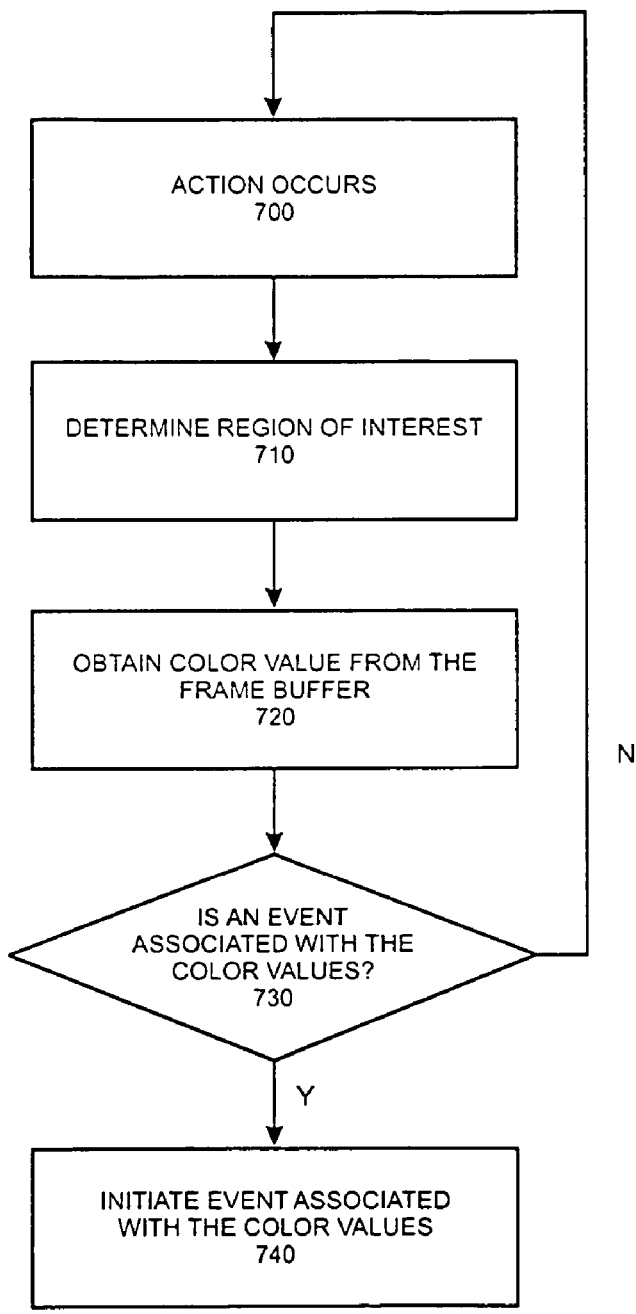
FIG. 7 shows an embodiment of the present invention where the frame buffer is utilized.

One embodiment of the present invention takes advantage of the data already existing in the frame buffer, for instance to perform step 120 of FIG. 1. FIG. 7 shows an embodiment of the present invention where the frame buffer is utilized.

At step 700, an action occurs. At step 710, the location of the action (a region of interest) is determined. Next, at step 720, the invention access the frame buffer to obtain color values at the location of the action when it occurred. Then, it is determined whether any event is associated with the color value at step 730. If no event is associated with that color value, no event is initiated and the process repeats at step 700. If an event is associated with the color value, then at step 740 an event associated with the color value is initiated.

Events

As described above, one event is a link to another URL (i.e., to facilitate a transaction over the Internet). Thus, one event may comprise the retrieval of a web page from a server computer connected to the Internet.

In the context of streaming media, an event may be the retrieval of a text page. For instance, assume the user is watching a DVD program showing several of the great pyramids of Egypt. If the user causes an event to occur in a region of interest defined by a specific pyramid, then the event may comprise the retrieval of a text page telling the user exactly which pyramid this is, when it was built, the history associated with this particular pyramid, and any other pertinent information. Thus, the event would cause the DVD to move to a different data track (i.e., to pull up different information).

In the same great pyramid example, another event may comprise the retrieval of audio information, for instance a narrator providing information similar to that given in the text track in the above example. Furthermore, the event may comprise the retrieval of a new media stream, such as the close up of the pyramid, alternate angles showing different views of the same pyramid, or views from inside the pyramid, for example.

In one embodiment an event comprises the retrieval of a data track. A data track comprises information associated with the color acted upon. Assume for instance, that this embodiment of the present invention takes place using an interactive television set. While the interactive television set is operating, a game show host appears wearing a green shirt. Then assume, for instance, that a user caused an action to occur at the location of the green shirt. In this instance, the data track may be information about the shirt, the game show host, or any other relevant information.

Whether an event is associated with a color value may be determined in a plurality of ways. One such way is to use a table. An example of one embodiment of a table is shown in table 1.

TABLE 1

| Color Value | Event |
|---|---|
| 100 | retrieve document at URL www.info.com/test |
| 300 | obtain data track at a specified location |
| 200 | initiate media stream at specified location |
| 288 | initiate audio track at specified location |

The table may be arranged in a plurality of ways and may be accessed in methods well known to those skilled in the art, including hash tables, hash functions, pointers, indices, or any other suitable form of table lookup. In addition, different color values ray initiate the same event. Alternatively, every color value on an output device may be associated with the same event.

Figure 5:
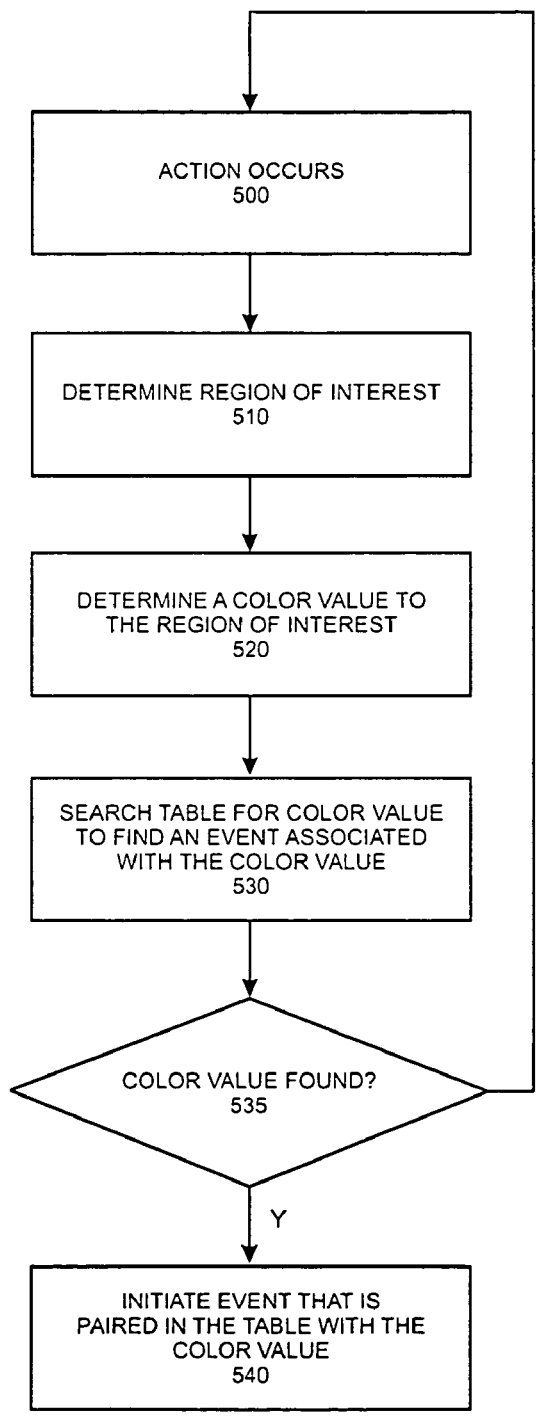
FIG. 5 is a flowchart showing how to associate the color of an object with an event using a table according to an embodiment of the present invention.

FIG. 5 shows an embodiment of the present invention where a table is implemented. At step 500, an action occurs. At step 510, the location of the action (a region of interest) is determined. Then at step 520, the value associated with a color in the region of interest is determined. Next, a table is searched to locate the color value to obtain an event that is paired with the color value at step 530. Then, at step 535, it is determined whether the color value is in the table. If it is not, then that color value is not linked to an event and no event is initiated. In that case the process repeats at step 500. Otherwise, at step 540, the event is initiated.

Color Ranges

In another embodiment of the present invention regions of interest (i.e., those regions where a user has performed an action) are associated with events based on color ranges. A color range, for instance, includes of blue that correspond to the body of a bluebird in a video stream. Realistic image and video streams will not have a uniform shade of blue at all areas of the bluebird's body since light and other factors will cause natural variations in the perceived color reflected from an object. In this embodiment, this reality is accounted for, which gives this embodiment specific application in dynamic and high-quality video streams.

Color ranges are defined by color characteristics. For instance, a color range may translate into values on an RGB or HSV scale, or could be combinations of both. Typically, in a computer system such values range from 0-255. Thus, the bluebird's body may be defined as a region of interest where the color range includes a B value on the RGB scale of 50-75, for instance.

Thus, whether the action occurred at an upper left or lower right portion of the bluebird's body, the same event is initiated, despite the potential that at these corners of the regions of interest, the color values differed. All that is required in this embodiment is that both differing color values fall within the defined color range.

In many images, the colors may be very similar, yet they may be aspects of different components of the image and associated with different events. In one embodiment, the ranges are defined with respect to a plurality of color characteristics including RGB and HSV.

For instance, a range may be defined where the R is selected to have a range of 50-80, the G is selected to have a range of 150-160, and the B is selected to have a range of 200-220. An example color is selected by the user where the example color has RGB characteristics of 60, 155, and 205 respectively. Another color on the screen that is associated with a different event may appear to be substantially identical to the example color but has RGB characteristics of 190, 100, 33. Since the ranges have been defined by a plurality of characteristics, however, such minute differences in color shading are accounted for by this embodiment of the present invention.

Figure 8:
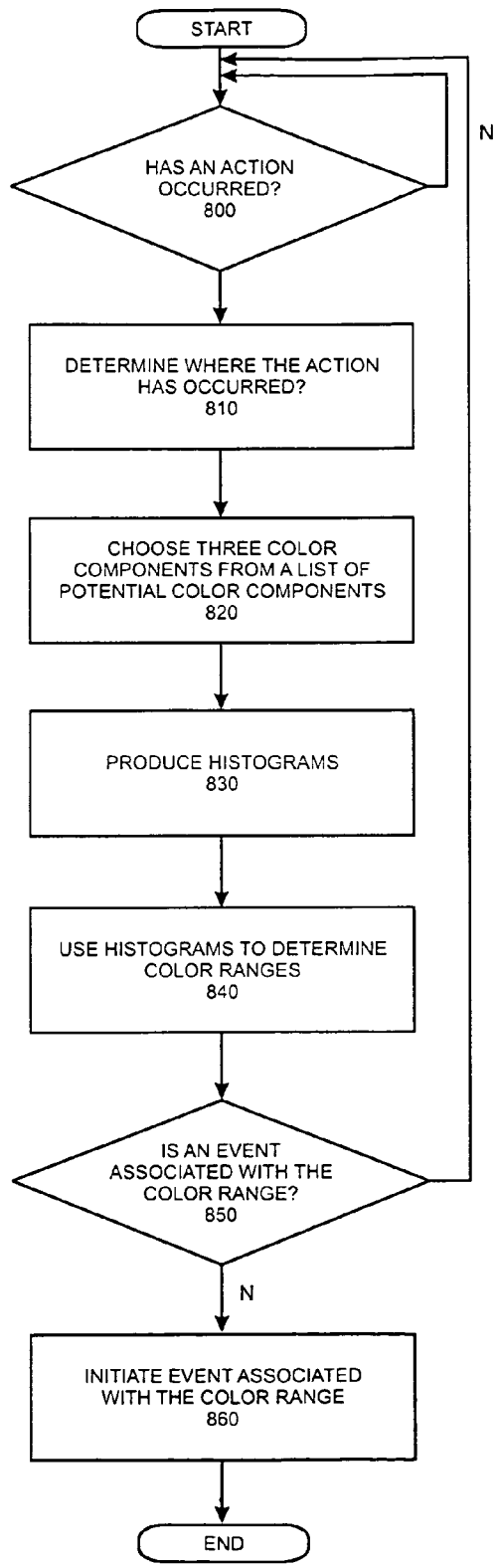
FIG. 8 shows an embodiment of the present invention where color ranges are utilized.

In one embodiment, the characteristics of the color are defined by R, G, B, H, S, V, and R-G, and G-B, where R-G and G-B have red and green and green and blue components respectively. In this embodiment, any three of these variables is sufficient to uniquely define all colors displayed on an output device or stored in a frame buffer. To determine whether the variables are within the color range for the purpose of determining whether an event will be associated with the area of interest, the following algorithm is used (shown in FIG. 8).

At step 800, it is determined whether an action has occurred. If no action occurred, step 800 repeats until an action occurs. If the action has occurred, it is determined where the action has occurred at step 810. Then at step 820, three variables are chosen from a list of possible color components, for instance, R, G, B, H, S, V, R-G, or G-B. For the chosen variables, histograms are produced at step 830.

A histogram is a graphical method for describing data. It is a presentation of quantitative data (i.e., color components) that have been summarized in a frequency distribution. The values of the quantitative variable are shown on the horizontal axis. A rectangle is drawn above each class such that the base of the rectangle is equal to the width of the class interval and its height is proportional to the number of data values in the class.

Using the histogram, the color ranges are determined at step 840, for instance by determining the variable peak on the histogram + or − three times its variance. After step 840, it is determined whether any event is associated with the color range at step 850. If no event is associated with that color range, no event is initiated and the process repeats at step 800. If an event is associated with the color range, then at step 860 an event associated with the color range is initiated.

Color Patterns

It is often beneficial to define a regions of interest that is not uniform in color. A region of interest, for instance, may be a plaid tablecloth. In this case, it is not adequate to use a single color value, nor a color range to define the region of interest. To account for this, one embodiment of the present invention uses color patterns to define the region of interest.

A color pattern comprises a representation of the colors in the region of interest, for instance a graphical representation, defined by a plot on an x,y axis. The varying colors in the region of interest create peaks and valleys in the color pattern, graph representation. By locating patterns of peaks and valleys in such a color pattern, multi-color patterns, such as the plaid tablecloth, are used to associate actions with events.

Edge Detection

One embodiment of the present invention uses an edge detection scheme to define the boundaries for the colors. The color component of an object is described by its pixels. An algorithm gives those pixels an "edge" which is not visible to the user, nor drawn on the screen, nor pre-processed prior to the user viewing the images formed by the pixels. For instance, an invisible wire frame is created to describe the shape of the given colored object to associate with the event. But the value of the pixels defines the wire frame rather than actually drawing a wire frame on the screen.

One embodiment of the present invention uses Quicktime, a software package available from Apple Computers™. In this embodiment, Quicktime is used to support the use of "sprites". A sprite is a clickable element within a video stream. Using Quicktime, a sprite is modified to be defined by its color component. Thus, one or more embodiments of the present invention create the associations between objects and events dynamically, in that the data which creates the association is a property of the image itself (i.e., its color values). The present invention requires no alteration or pre-processing of the image to create the associations.

Embodiment of Computer Execution Environment (Hardware)

Figure 6:
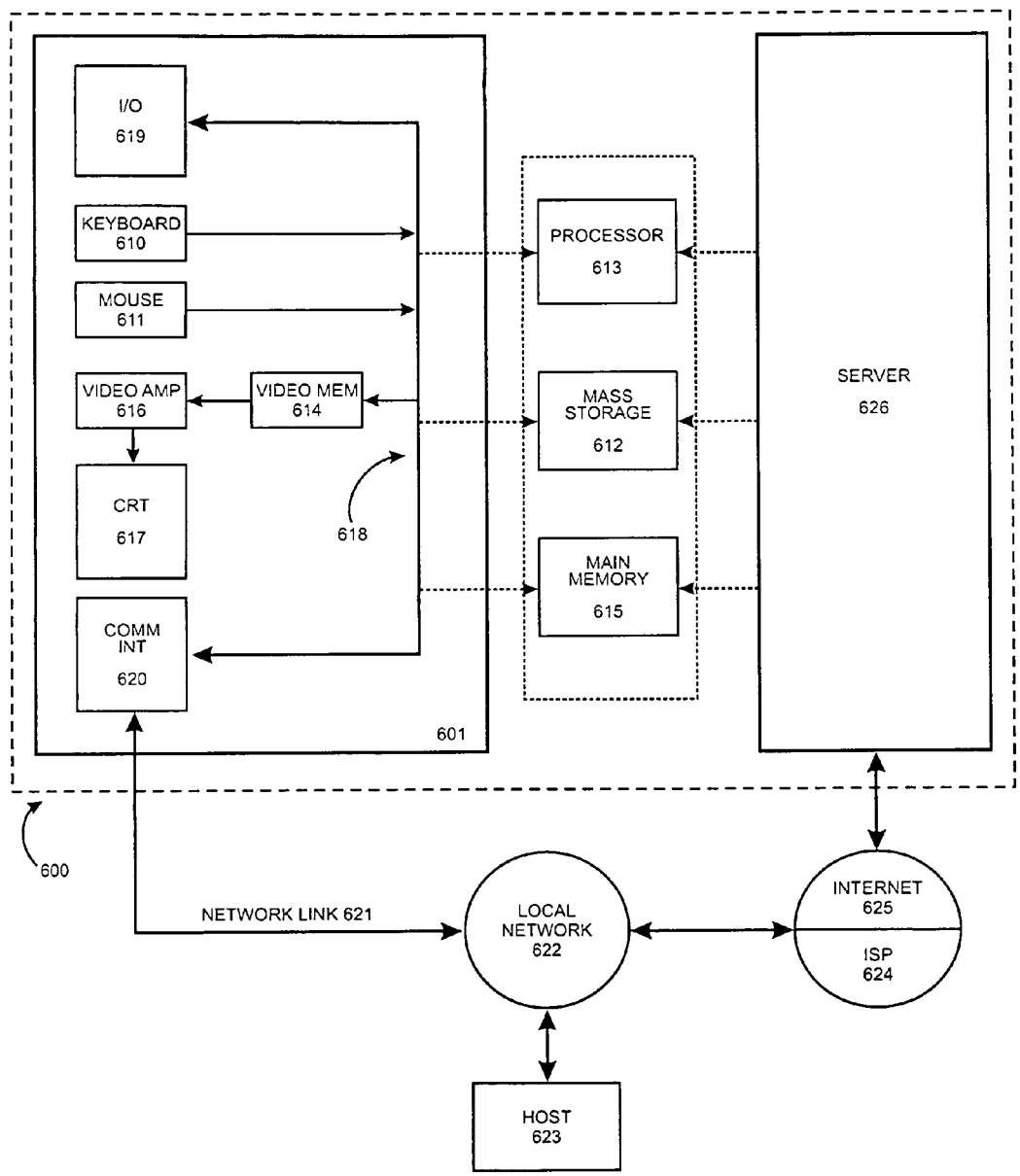
FIG. 6 is a computer execution environment where one or more embodiments of the present invention may be implemented.

An embodiment of the invention may be implemented as computer software in the form of computer readable program code executed in a general purpose computing environment such as environment 600 illustrated in FIG. 6, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to central processing unit (CPU) 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. Server 626 symbolically is represented in FIG. 6 as one unit, but server 626 may also be distributed between multiple "tiers". In one embodiment, server 626 comprises a middle and back tier where application logic executes in the middle tier and persistent data is obtained in the back tier. In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output.

Computer 601 includes a video memory 614, main memory 615 and mass storage 612, all coupled to bi-directional system bus 618 along with keyboard 610, mouse 611 and processor 613. As with processor 613, in various computing environments, main memory 615 and mass storage 612, may reside wholly on server 626 or computer 601, or they may be distributed between the two. Examples of systems where processor 613, main memory 615, and mass storage 612 are distributed between computer 601 and server 626 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 may send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by processor 613 as it is received, and/or stored in mass storage 612, or other non-volatile storage for later execution. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 625, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, and servers on a network.

The computer systems described above are for purposes of example only. An embodiment of the invention may be implemented in any type of computer system or programming or processing environment.

Thus, a method and apparatus for associating the color of an object with an event is described in conjunction with one or more specific embodiments. The invention is defined by the claims and their full scope of equivalents.

The invention claimed is:

1. A computerized method for making a URL link/no-link determination based on the color range of each of a plurality of color values corresponding to a designated object of interest in one or more succeeding video frames, comprising:

receiving a predetermined color range having a plurality of continuous color values;

associating a first URL with the predetermined color range;

designating the location of the object of interest in the one or more succeeding video frames, with a pointing device;

determining a color value of the designated location of the object of interest in the one or more succeeding video frames;

defining a color boundary for the object of interest by determining edges of plural pixels defining the object of interest, where the edges are not visible; and linking to the first URL when the determined color is within the predetermined color range and within the defined color boundary, but not linking to the first URL when the determined color value is not within the predetermined color range and not within the defined color boundary.

2. The method of claim 1, further comprising:
associating a second predetermined color range having a second plurality of continuous color values with a second URL; and
linking to the second URL when the determined color value is within the second predetermined color range.

3. The method of claim 1, wherein the determined color value comprises a color range.

4. The method of claim 1, wherein said receiving step further comprises receiving a second predetermined color range having a plurality of continuous second color values;
wherein said associating step further comprises the step of associating the first URL with the second predetermined color range;
wherein said determining step further comprises determining a second color value of the designated location of the object of interest in the one or more succeeding video frames; and
wherein said linking step further comprises linking to the first URL when both (i) the determined color value is within the predetermined color range and (ii) the determined second color value is within the second predetermined color range, but not linking to the first URL when either (i) the determined color value is not within the predetermined color range or (ii) the determined second color value is not within the second predetermined color range.

5. The method of claim 1, wherein the determined color value comprises at least one of a RGB or HSV characteristic.

6. The method of claim 1, further comprising retrieving information from the first URL.

7. The method of claim 6 wherein the object of interest comprises an image residing in a web browser.

8. The method of claim 6, wherein the object of interest comprises an image residing in a streaming media.

9. The method of claim 1, further comprising retrieving a web page at a specified URL when said first URL is linked.

10. The method of claim 1, further comprising retrieving a data track when said first URL is linked.

11. A non-transitory computer readable product, comprising:
computer readable code configured to cause one or more computers to:
receive a predetermined color range having a plurality of continuous color values
associate a first URL with the predetermined color range,
receive from a pointing device the designation of the location of an object of interest in one or more succeeding video frames,
define a color boundary for the object of interest by determining edges of plural pixels defining the object of interest, where the edges are not visible,
determine a color value of the designated location of the object of interest in the one or more succeeding video frames, and
link to the first URL when the determined color value is within the predetermined color range and within the defined color boundary, but not link to the first URL when the determined color value is not within the predetermined color range and not within the defined color boundary.

12. A non-transitory computer readable product of claim 11, wherein the computer readable code is further configured to cause the one or more computers to associate a second predetermined color range having a second plurality of continuous color values with a second URL, and to link to the second URL when the determined color value is within the second predetermined color range.

13. A non-transitory computer readable product of claim 11, wherein the determined color value comprises a color range.

14. A non-transitory computer readable product of claim 11, wherein said receive step further comprises receiving a second predetermined color range having a plurality of continuous second color values;
wherein said associate step further comprises the step of associating the first URL with the second predetermined color range;
wherein said determine step further comprises determining a second color value of the designated location of the object of interest in the one or more succeeding video frames; and
wherein said link step further comprises linking to the first URL when both (i) the determined color value is within the predetermined color range and (ii) the determined second color value is within the second predetermined color range, but not linking to the first URL when either (i) the determined color value is not within the predetermined color range or (ii) the determined second color value is not within the second predetermined color range.

15. A non-transitory computer readable product of claim 11, wherein the determined color value comprises at least one of a RGB or HSV characteristic.

16. A non-transitory computer readable product of claim 11, wherein the computer readable code is further configured to cause the computer to retrieve information from the first URL.

17. A non-transitory computer readable product of claim 16, wherein the object of interest comprises an image residing in a web browser.

18. A non-transitory computer readable product of claim 16, wherein the object of interest comprises an image residing in a streaming media.

19. A non-transitory computer readable product of claim 11, wherein the computer readable code is further configured to cause the one or more computers to retrieve a web page at a specified URL when said first URL is linked.

20. A non-transitory computer readable product of claim 11, wherein the computer readable code is further configured to cause the one or more computers to retrieve a data track when said first URL is linked.

21. A system for making a URL link/no-link determination based on the color value of an object of interest in one or more succeeding video frames, comprising:
one or more computers configured to:
receive a predetermined color range having a plurality of continuous color values
associate a first URL event with the predetermined color range;
receive from a pointing device the designation of the location of an object of interest in the one or more succeeding video frames, define a color boundary for the object of interest by determining edges of plural pixels defining the object of interest, where the edges are not visible, determine a color value of the designated location of the object of interest in the one or more succeeding video frames; and link to the first URL when the determined color value is within the predetermined color range and within the defined color boundary, but not linking to the first URL when the determined color value is not within the predetermined color range and not within the defined color boundary.

22. The system of claim 21, wherein the one or more computers is also configured to:

associate a second predetermined color range having a second plurality of continuous color values with a second URL; and link to the second URL when the determined color value is within the second predetermined color range.

23. The system of claim 21, wherein the determined color value comprises a color range.

24. The system of claim 21, wherein the one or more computers is also configured to:

receive a second predetermined color range having a plurality of continuous second color values;

associate the first URL with the second predetermined color range;

determine a second color value of the designated location of the object of interest in the one or more succeeding video frames; and link to the first URL when both (i) the determined color value is within the predetermined color range and (ii) the determined second color value is within the second predetermined color range, but not linking to the first URL when either (i) the determined color value is not within the predetermined color range or (ii) the determined second color value is not within the second predetermined color range.

25. The system of claim 21, wherein the determined color value comprises at least one of a RGB or HSV characteristic.

26. The system of claim 21, wherein the one or more computers is configured to retrieve information from the first URL.

27. The system of claim 26 wherein the of interest comprises an image residing in a web browser.

28. The system of claim 26, wherein the of interest comprises an image residing in a streaming media.

29. The system of claim 21, wherein the one or more computers is configured to retrieve a web page at a specified URL when said first URL is linked.

30. The system of claim 21, wherein the one or more computers is configured to retrieve a data track when said first URL is linked.

31. Apparatus configured to link a pointing device designation to an event, comprising:

an input configured to receive a pointing device designation of an object of interest in at least one video frame in a sequence of video frames; and one or more computers coupled to said input and configured to:

store a plurality of predetermined color ranges, each color range comprising a continuous plurality of color values, store an association of an event with the stored plurality of predetermined color ranges;

receive from said input the designated object of interest;

define a color boundary for the object of interest by determining edges of plural pixels defining the object of interest, where the edges are not visible;

compare plural color values of (i) each pixel of the received designated object of interest within the defined color boundary with (ii) the stored plurality of predetermined color ranges; and link to the event when the plural color values of the received designated object of interest are respectively within the stored plurality of predetermined color ranges.

32. Apparatus according to claim 31, wherein the event comprises one or more of viewing media via a URL, television, DVD, media player, set-top device, web-TV, interactive TV, and video-games.

33. Apparatus according to claim 31, wherein the stored plurality of predetermined color ranges comprises two or more of ranges of R, G, B, H, S, V, R-B, and G-B.

34. Apparatus according to claim 31, wherein the one or more computers is also configured to:

form respective histograms of the plural color values of the received designated object of interest; and compare the formed histograms with the stored plurality of predetermined color ranges.

35. Apparatus according to claim 31, wherein the plurality of predetermined color ranges comprises ranges for each of R,G,B and H,S,V.

36. Apparatus according to claim 31, wherein the plurality of predetermined color ranges comprises a plurality of color patterns, each color pattern comprising peaks and valleys of color values.

37. Apparatus according to claim 36, wherein at least one color pattern comprises a plaid color pattern.

* * * * *